(12) United States Patent
Petro

(10) Patent No.: US 7,873,337 B2
(45) Date of Patent: Jan. 18, 2011

(54) SMALL SIGNAL IDENTIFICATION DEVICE

(75) Inventor: Jason Andrew Petro, 223 Provincial Dr., Indialantic, FL (US) 32903

(73) Assignee: Jason Andrew Petro, Indialantic, FL (US)

( * ) Notice: Subject to any disclaimer, the term of this patent is extended or adjusted under 35 U.S.C. 154(b) by 700 days.

(21) Appl. No.: 11/881,769

(22) Filed: Jul. 30, 2007

(65) Prior Publication Data

US 2009/0036073 A1 Feb. 5, 2009

Related U.S. Application Data

(60) Provisional application No. 60/840,676, filed on Aug. 28, 2006.

(51) Int. Cl.
*H04B 1/18* (2006.01)
(52) U.S. Cl. .............. 455/154.1; 455/158.2; 455/161.1; 455/41.3

(58) Field of Classification Search ................ 455/41.2, 455/41.3, 150.1, 154.1, 154.2, 156.1, 158.2, 455/160.1, 161.1, 161.2, 161.3, 170.1, 182.1, 455/182.2, 184.1, 185.1, 186.1
See application file for complete search history.

(56) References Cited

U.S. PATENT DOCUMENTS

| 5,129,098 A * | 7/1992 | McGirr et al. ................ 455/69 |
| 2006/0293007 A1 * | 12/2006 | Kim ........................... 455/145 |
| 2008/0076352 A1 * | 3/2008 | Der ............................ 455/41.2 |

* cited by examiner

*Primary Examiner*—Edward Urban
*Assistant Examiner*—Christian A Hannon

(57) ABSTRACT

A portable device that scan s a subset of frequencies, such as the FM band, and displays to user the best carrier frequency for transmissions based on the received signal strengths. This device will find the carrier frequency that can provide the least amount of signal interference due to other transmitters in the area, and display the results to the user and/or reconfigures the receiver to tune to the best carrier frequency detected.

11 Claims, 4 Drawing Sheets

Electrical Hardware Design Block Diagram

SMALL SIGNAL IDENTIFICATION DEVICE

PRIORITY

The following Specification claims priority to Provisional Patent Application No. 60/840,676 filed on Aug. 28, 2006.

FIELD OF INVENTION

This invention relates to the field of wireless communications, particularly in the area of identifying the signal strength levels of carrier frequencies and providing feedback to a user.

BACKGROUND OF INVENTION

Currently, low power FM transmitters are used frequently for integrating digital music players/receivers, such as MP3 players and Satellite Radio receivers, to other existing sound systems that may be located in vehicles or homes. The use of low power FM transmitters allow for simple means to listen to broadcasted digital music on existing sound systems.

While low power FM transmitters provide a means to connect digital music players to existing sound systems, the quality of the sound can be impeded by signal interferences due to other transmitters located in the area. Among other reasons, this problem is especially bad in urban areas having crowded FM bands due to a high number of radio signals transmitting in the area. The higher the level of signal interference, the worse the sound quality gets.

Currently, methods for finding the optimal carrier frequency entail having a user manually search for uninhabited stations. This method can be very laborious and time consuming, especially in a vehicle where the RF environment is very dynamic due to the vehicle moving. Current solutions do not provide a means to locate the best frequency for transmission so as to get the best sound quality possible.

BRIEF DESCRIPTION OF DRAWINGS/FIGURES

In accordance with one embodiment of this invention

DETAILED DESCRIPTION OF INVENTION

The present invention relates to low power FM transmitters, specifically for close range wireless communications. In an exemplary embodiment of the invention, the invention will automatically search and notify the user of the best possible station so as to optimize the sound quality of a digital music player.

For the purposes of promoting an understanding of the principles of the invention, reference will now be made to the embodiment illustrated in the figures. It will nevertheless be understood, that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
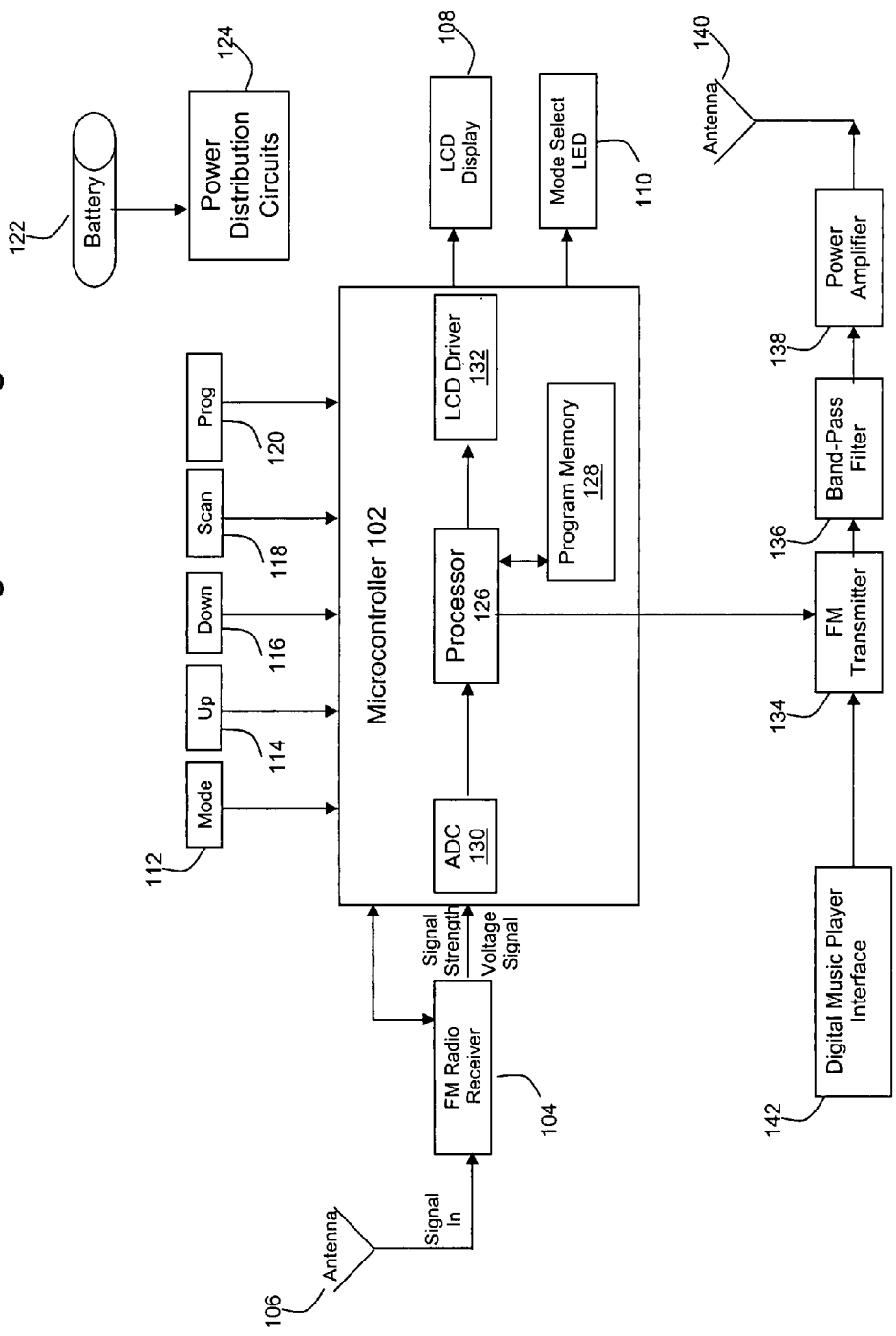
FIG. 1 is a block diagram of the basic hardware architecture of the present invention.

FIG. 1 illustrates a basic component block diagram that could be used to implement one embodiment of this invention. The embodiment shown in FIG. 1 relates to, but is not limited to, a FM Band specific embodiment of this invention. Other bands and embodiments may also be implemented. The schematic detailing the implementation of one possible embodiment of this invention is illustrated in the Appendix.

As shown in FIG. 1, microcontroller 102 communicates with all major system components and provides the main system control for the device. The microcontroller 102 with integrated processor 126, Analog-to-Digital Converter 130 (ADC), program memory 128 and LCD driver 132, such as the Microchip PIC18F6490 may be used to help minimize overall system complexity and component count. The implementation of the present invention is not limited to one integrated microcontroller such as the Microchip PIC18F6490, but rather could be comprised of all the individual components required to implement the microcontroller functionality. Microcontroller 102 is also responsible for monitoring user interface buttons 112, 114, 116, 118 and 120 to determine the intended state the user desires the device to operate in.

Depending on how the user has configured the device, the device of the exemplary embodiment shown in FIG. 1 is intended to operate in one-of-two ways. The user interface button, MODE 112, is used to supply the user with a means to place the device in the desired configuration. Select 110, MODE LED, is used to convey to the user the current configuration of the device. If the user intends for the device to scan all FM band frequencies, then the device should be put into a SCAN ALL configuration which is exhibited by LED 110 being turned off. Conversely, if the user intends for the device to scan only the subset of frequencies, previously programmed by the user, then the device should be put into a SCAN PROGRAMMED configuration which is exhibited by LED 110 being turned on. To change device configuration between SCAN ALL and SCAN PROGRAMMED, the user need only to depress user interface button 112.

Once the device has been properly configured, via button 112, the next step is for the device to scan the set or subset of frequencies intended by the user. If the device is configured in a SCAN ALL mode, then it needs to scan all the frequencies within the FM band of that region, usually ranging from 87.7-108.0 MHz. If the device is configured for a SCAN PROGRAMMED mode, then it will only scan the subset of frequencies that the user programs into its memory. Programming particular frequencies into the device is done using user interface buttons 114, 116 120. The user interface buttons 114, UP, and 116, DOWN, allow user to transverse up and down the FM frequency band, respectively. The current frequency that the device is set to, will be shown on LCD Display 108. Once the device displays a frequency of interest to the user, programming is done by depressing user interface button 120, PROG. By depressing user interface button 120, the device will save the frequency displayed on LCD Display 108 to memory so as to include in the subset of frequencies to be scanned in the future. This procedure is to be repeated until all frequencies that desire scanning are programmed into memory.

User interface button 118, SCAN, is used to execute the automatic frequency scan mode of the device. The automatic frequency scan mode enables the device to scan all specified frequencies, and display the carrier frequency that has the smallest electric field intensity, via LCD Display 108.

To perform the automatic frequency scan mode, processor 126 first accesses the program memory 128 location containing the information of the first frequency that is to be checked. Microcontroller 102 then configures FM Radio Receiver 104 to tune to that frequency. An integrated circuit FM radio receiver, such as the Phillips TEF6701, containing an integrated mixer, local oscillator, automatic gain control (AGC), and level detector circuitry with received signal strength indicator (RSSI) may be used to help minimize overall system complexity and component count. The implementation of the present invention is not limited to one integrated FM radio component such as the Phillips TEF6701, but rather could be comprised of all the individual components required to implement the FM radio functionality. FM radio receiver 104 may then signal back to microcontroller 102, notifying the microcontroller 102 that the receiver 104 is now configured and locked to the specified frequency.

Next, radio frequency (RF) signals that are received at an Antenna 106 are applied to FM radio receiver 104. The RF signals received at the tuned frequency are frequency demodulated into an intermediate frequency (IF), and the level detector circuitry outputs an RSSI voltage signal to the microcontroller 102. The RSSI is an analog voltage signal out of FM radio receiver 104 that is directly proportional to the received RF input signal strength at the tuned frequency.

The RSSI voltage signal output from FM radio receiver 104 is then applied to integrated ADC contained in microcontroller 102. The ADC will convert the applied RSSI voltage signal to a digital value. The digital value will then be saved to memory and run through software algorithms.

Figure 2:
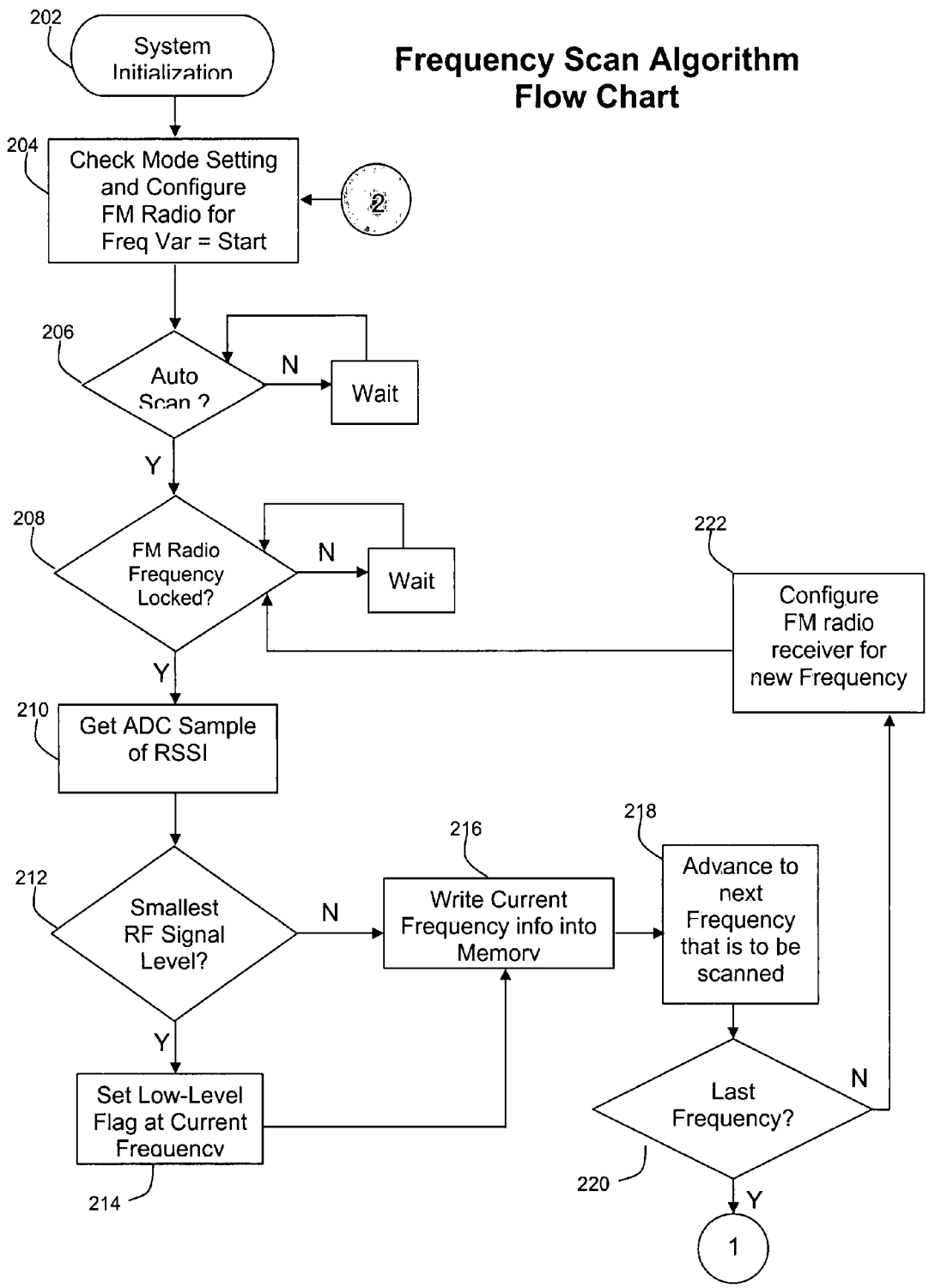
FIGS. 2 and 2A are flow charts showing the scanning program executed by a microprocessor, in accordance with one embodiment of the present invention.
Figure 2A:
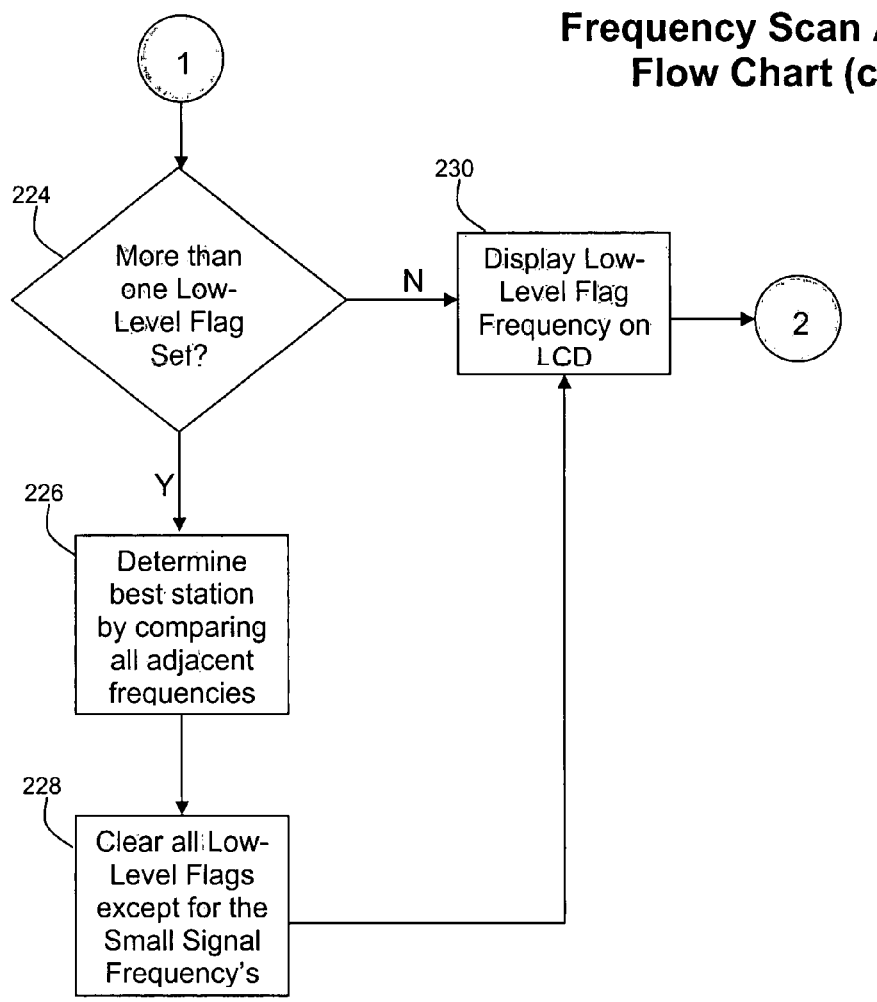

Processor 126 controls the automatic frequency scan function. As shown in FIG. 2A, the processor 126 first begins executing system initialization tasks (step 202), configuring all major system components such as FM radio receiver 104 and LCD display 108. Upon completion of the system initialization, all major system components should be properly powered up and ready for normal system operations.

Once all system initialization tasks have completed, processor 126 checks the state of user interface button 112, MODE, to determine the mode which the user intends to use the device. Processor 126 configures FM radio receiver 104 for tuning to first frequency that is to be checked (step 204). For example, if the device is operating in a SCAN ALL mode the first frequency will be the lowest frequency in FM band, 88.1 MHz. Alternately, if the device is operating in a SCAN PROGRAMMED mode, the first frequency will be the lowest frequency programmed into memory previously by the user.

Next processor 126 waits for the user to initiate the automatic frequency scan mode by monitoring the state of user interface button 118, SCAN (step 206). Once the user initiates the automatic scan function, microcontroller 102 then waits for FM radio receiver 104 to signal that it has properly locked on to the configured frequency (in step 208).

Upon receiving the lock indication from FM radio receiver 104, processor 126 then acquires a digital sample of the RSSI (step 210) from ADC 130. The digital value is then run through a software algorithm to determine if it is a possible candidate for display to the user. One possible embodiment that may be used is the use of a Look-up-Table (LUT) and/or a Low-Level Flag indicator. Each scanned frequency will have a LUT entry that will be stored in memory containing the frequency FM radio receiver 104 was tuned too, the digital value representing the RSSI signal from FM radio receiver 104 and a Low-Level Flag. The Low-Level Flag is a bit that will be used to indicate if that frequency has the lowest existing RF signal level encountered thus far. For example, setting the Low-Level Flag=1, implies that entry in the LUT has the frequency with the lowest RF signal level encountered thus far. For the purposes of this document, a frequency with Low-Level Flag=1, will be referred to as a "Small Signal-Frequency". Conversely, if Low-Level Flag=0, implies that the corresponding carrier frequency is not a good candidate for transmissions, thus will not be displayed to the user.

The newly acquired digital sample is then compared against the value of the current Small Signal-Frequency, if one exists yet (step 212). (If no Small Signal-Frequency has been established yet, the current frequency automatically becomes the Small Signal-Frequency by default.) If the current frequency has a RSSI signal that is less than or equal too that of the current Small Signal-Frequency, its Low-Level flag is set to 1 (step 214) and the entry is then stored in the LUT located in memory (step 216). If the current frequency has a RSSI signal that is greater than the current Small Signal-Frequency, the Low-Level flag is cleared (set to 0) and the entry is then stored in the LUT located in memory (step 216).

Next, the frequency pointer advances to the next frequency that is to be scanned (step 218). The algorithm then checks to see if the end of the frequency list has been reached (step 220). If the end of the list has NOT been reached, FM radio receiver 104 is then configured to tune to the new frequency (step 222), and steps 208 thru 220 are repeated until the end of the list has been reached.

Once the last frequency has been scanned and all required information is stored to memory, the algorithm then checks to for more than one occurrence of a Small Signal-Frequency candidate (i.e., more than one frequency has its Low-Level Flag set to 1) (step 224). If only one unique Small Signal-Frequency exists, then that frequency is displayed to the user via LCD display 108 (step 230) and the algorithm resets by returning to step 204. However, if two or more frequencies are candidates for the Small Signal-Frequency, the RSSI levels of adjacent frequencies (one channel/station higher and one channel/station lower in the band) will be referenced. The frequency having the lowest surrounding RSSI levels will be the new unique Small Signal-Frequency and all other candidates will have their corresponding Low-Level Flags cleared (step228). This method helps account for possible inter-channel interference that may be produced by strong signals on adjacent channels. Now, that a single unique Small Signal-Frequency has been established, that frequency is displayed to the user via LCD display 108 (step 230) and the algorithm resets by returning to step 204.

Figure 3:
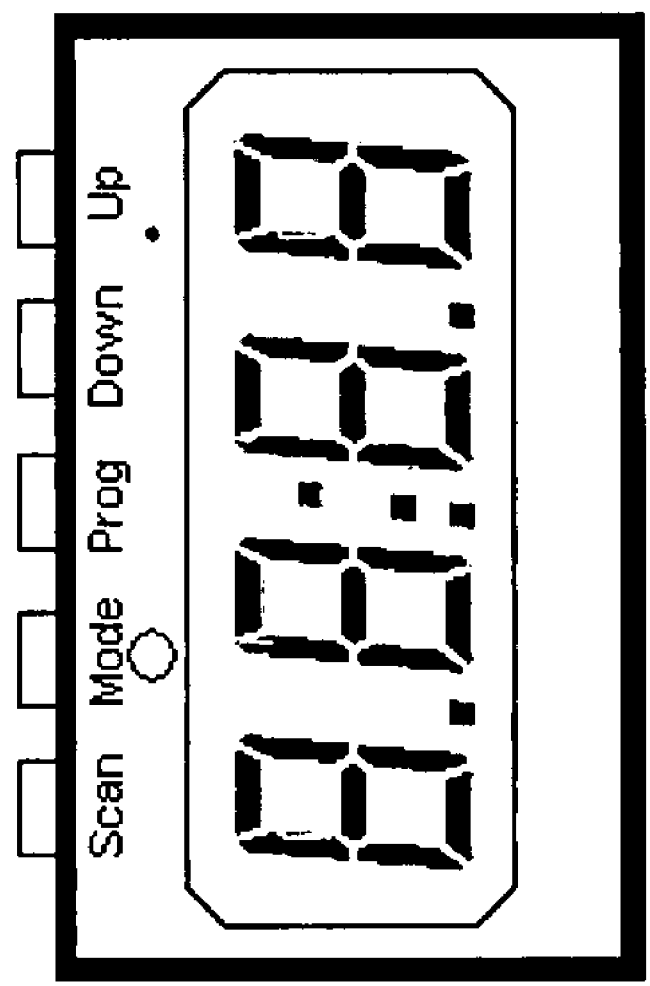
FIG. 3 is an illustration of one embodiment of the present invention.

One possible embodiment of a completed invention is shown in FIG. 3. The mechanical design of the device is intended to be relatively small in size so as to maintain portability to the user. The device itself will consist mainly of a 4-digit 7-segment LCD display, a PCB board having similar length and width dimensions as the LCD display and an enclosed housing that encapsulates all components.

Although one single embodiments of the invention have been shown and described herein, it is not meant to be limiting. Those of skill in the art may recognize modifications to this embodiment, which modifications are meant to be covered by the spirit and scope of the appended claims.

That which is claimed:

1. A method for detecting clear radio frequencies comprising;
   tuning a receiver to a frequency channel;
   detecting a radio frequency (RF) signal on the tuned frequency channel;
   determining a received signal strength indicator (RSSI) voltage signal, wherein the RSSI is proportional to the received RF signal strength at the tuned frequency channel;
   converting the RSSI voltage signal into a digital value;
   triggering a low level flag indicator when the digital value is below a predetermined value;

tuning the receiver to at least one different frequency channel and repeating the detecting, the determining, the converting and the triggering;

storing the tuned frequency channels with the low level flag indicators;

if two or more tuned frequency channels with low level flags are stored, then determining at least one RSSI signal level of at least one adjacent frequency channel for each of the two or more tuned frequency channels;

comparing the respective RSSI signal levels of the at least one adjacent frequency channels to determine a lowest RSSI signal level, and selecting the tuned frequency channel with the at least one adjacent frequency channel having the lowest RSSI signal level; and transmitting a short range signal on the selected tuned frequency channel.

2. The method of claim 1, wherein the tuned frequency channel is between 87.7 MHz and 108.0 MHz.

3. The method of claim 1, further comprising demodulating the RF signal into an intermediate frequency, and wherein determining the at least one RSSI voltage signal is based on the intermediate frequency.

4. The method of claim 1, wherein the at least one adjacent frequency channel comprises both an upper frequency channel and a lower frequency channel.

5. The method of claim 1, further comprising displaying the selected tuned frequency channel.

6. The method of claim 1, further comprising deleting the stored tuned frequency channels except for the selected tuned frequency channel used to transmit the short range signal.

7. A system for detecting clear radio frequencies comprising;

a receiver to be tuned to a frequency channel;

a controller assembly coupled to said receiver and configured to perform the following detect a radio frequency (RF) signal on the tuned frequency channel, determine a received signal strength indicator (RSSI) voltage signal, wherein the RSSI is proportional to the received RF signal strength at the tuned frequency channel, convert the RSSI voltage signal into a digital value, trigger a low level flag indicator when the digital value is below a predetermined value, tune said receiver to at least one different frequency channel and repeating the detecting, the determining, the converting and the triggering, storing the tuned frequency channels with the low level flag indicators, if two or more tuned frequency channels with low level flags are stored, then determining at least one RSSI signal level of at least one adjacent frequency channel for each of the two or more tuned frequency channels, comparing the respective RSSI signal levels of the at least one adjacent frequency channels to determine a lowest RSSI signal level, and selecting the tuned frequency channel with the at least one adjacent frequency channel having the lowest RSSI signal level; and a transmitter coupled to said a controller assembly for transmitting a short range signal on the selected tuned frequency channel.

8. The system of claim 7, wherein the tuned frequency channel is between 87.7 MHz and 108.0 MHz.

9. The system of claim 7, wherein the at least one adjacent frequency channel comprises both an upper frequency channel and a lower frequency channel.

10. The system of claim 7, further comprising a display coupled to said controller assembly for displaying the selected tuned frequency channel.

11. The system of claim 7, wherein said controller assembly delete the stored tuned frequency channels except for the selected tuned frequency channel used to transmit the short range signal.

* * * * *